US006925456B2

(12) United States Patent
Nakano et al.

(10) Patent No.: US 6,925,456 B2
(45) Date of Patent: Aug. 2, 2005

(54) INFORMATION SEARCHING APPARATUS AND METHOD FOR ONLINE AWARD ENTRY

(75) Inventors: Yumiko Nakano, Kawasaki (JP); Toshikazu Sato, Kawasaki (JP); Akira Kamakura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 72 days.

(21) Appl. No.: 09/788,491

(22) Filed: Feb. 21, 2001

(65) Prior Publication Data

US 2001/0037377 A1 Nov. 1, 2001

(30) Foreign Application Priority Data

Apr. 27, 2000  (JP) ...................................... 2000-127320

(51) Int. Cl.⁷ ............................................. G06F 17/30
(52) U.S. Cl. ............................... 707/1; 707/2; 707/102
(58) Field of Search .............................. 707/1, 2, 102, 707/8, 9, 10, 513; 705/14, 26, 7, 1, 10, 11; 709/217

(56) References Cited

U.S. PATENT DOCUMENTS

| | | | | |
|---|---|---|---|---|
| 5,895,461 A | * | 4/1999 | De La Huerga et al. | ........ 707/1 |
| 5,999,914 A | * | 12/1999 | Blinn et al. | .................... 705/26 |
| 6,026,433 A | * | 2/2000 | O'Arlach et al. | ........... 709/217 |
| 6,061,660 A | * | 5/2000 | Eggleston et al. | ............ 705/14 |
| 6,070,162 A | * | 5/2000 | Miyasaka et al. | ............... 707/4 |
| 6,094,649 A | * | 7/2000 | Bowen et al. | .................. 707/3 |
| 6,466,970 B1 | * | 10/2002 | Lee et al. | .................... 709/217 |
| 2002/0040311 A1 | * | 4/2002 | Douglass et al. | .............. 705/7 |
| 2002/0133516 A1 | * | 9/2002 | Davis et al. | ................ 707/513 |
| 2002/0138439 A1 | * | 9/2002 | Matsushima et al. | ......... 705/52 |
| 2003/0005287 A1 | * | 1/2003 | Wray et al. | ................. 713/155 |

FOREIGN PATENT DOCUMENTS

JP        A-11-328219        11/1999

* cited by examiner

Primary Examiner—Charles Rones
Assistant Examiner—Neveen Abel-Jalil
(74) Attorney, Agent, or Firm—Staas & Halsey LLP

(57) ABSTRACT

Location information of content information (whose location is unpublished on a network) transmitted by a location unpublished information transmitting unit is stored to a database. A web page (containing a search keyword input field) transmitted by a search keyword input page transmitting unit is browsed by a web page browsing unit. A keyword that is input to the search keyword input field is transmitted to an information searching apparatus. A searching unit searches a database for content information corresponding to the keyword. When the keyword correlates with information transmitted by the location unpublished information transmitting unit, the user can find content information of which the location is unpublished with a user's terminal apparatus.

10 Claims, 19 Drawing Sheets

FIG. 4

115 TARGET PAGE

Congratulations!

YOU COULD SUCCESSFULLY FIND THE PAGE IN THE UNIVERSE OF THE INTERNET. FILL IN THIS FORM AND GET NICE AWARD.

RAW CHOCOLATE PROFESSIONALLY MADE BY CHEF

123 AWARD ENTRY FORM

NAME :
ADDRESS :
TELEPHONE :
E-Mail :
AWARD ENTRY KEYWORD : _____

124 AWARD ENTRY KEYWORD INPUT FIELD

[SEND]

REFERENCE PAGE 116

RAW CHOCOLATE PROFESSIONALLY MADE BY CHEF

ANNOUNCEMENT OF RESULTS OF SAMPLING QUESTIONNAIRE!!

- DESIGN OF PACKAGE?
  VERY GOOD 30%, GOOD 18%, NORMAL 26%, BAD 14%, NOT ABOVE 12%

- TASTE OF RAW CHOCOLATE?
  TASTEFUL 48%, NORMAL 26%, BAD TASTE 16%, NOT ABOVE 10%

- PRICE?
  MODERATE 50%, EXPENSIVE 30%, INEXPENSIVE 10%, NOT ABOVE 10%

FIG. 5

INDEX DATABASE
(FOR REGULAR SEARCH SERVICE AND PROMOTION)

112, 113

INDEX TABLE — 131

| SEARCH KEYWORD | INDEX NUMBER | | | |
|---|---|---|---|---|
| RAW CHOCOLATE | 1 | 2 | 5 | 8 | 10 |
| CHEF | 3 | 4 | 6 | 7 | 9 |
| PROFESSIONAL | 2 | 3 | 5 | 8 | 11 |
| RAW CREAM | 1 | 3 | 4 | 5 | 8 |
| RAW SENSE | 1 | 2 | 6 | 9 | 12 |
| ... | | | | | |

ANSWER TABLE — 132

| No. | TITLE / URL / SUMMARY |
|---|---|
| 1 | RAW CHOCOLATE PROFESSIONALLY MADE BY CHEF |
|  | http://www.choko.co.jp/nama/ |
|  | MADE WITH STRONG REQUESTS FOR RAW CHOCOLATE. MUCH RAW CREAM! MILDER! |
| 2 | ANNOUNCEMENT OF NEW PRODUCT |
|  | http://www.choko.co.jp/new/ |
|  | ANNOUNCEMENT OF NEW PRODUCT. IN THIS SPRING, RAW CHOCOLATE PROFESSIONALLY MADE BY CHEF. NEW PRODUCT. MADE WITH STRONG REQUESTS FOR RAW CHOCOLATE. |
| ... | |

F I G. 7

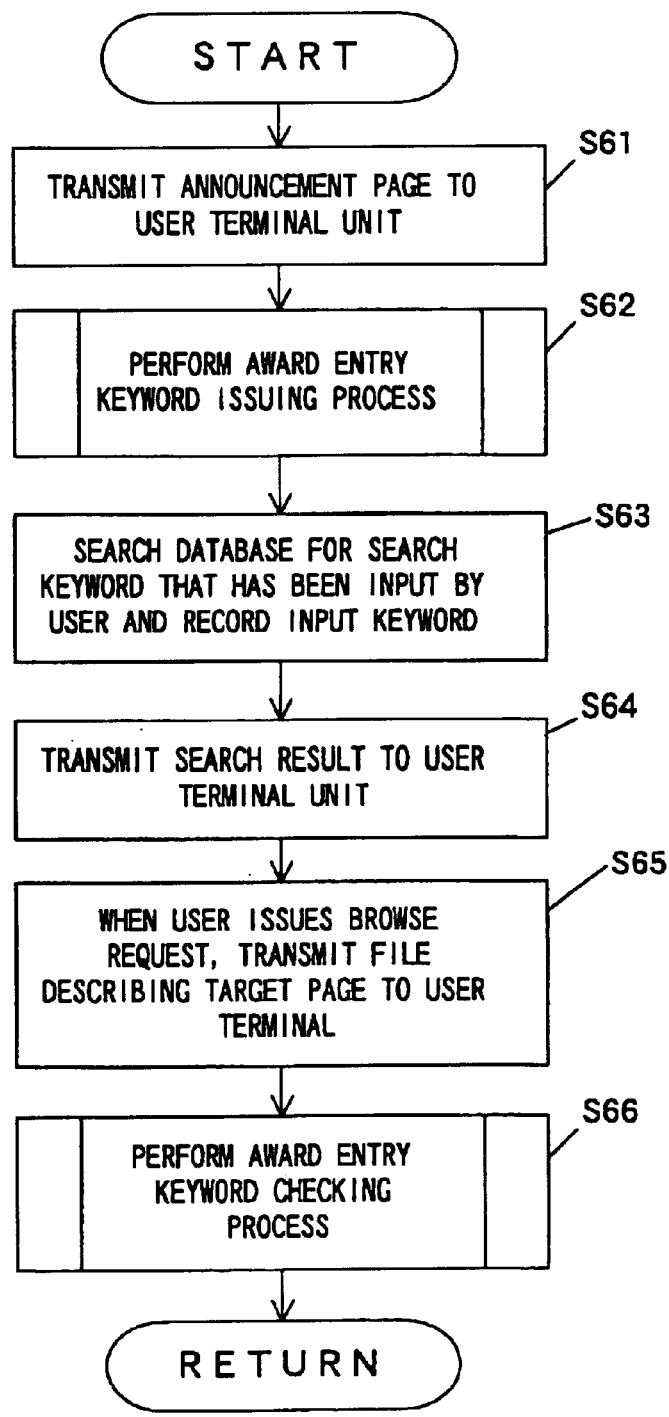
F I G. 1 4

SUBMITTED TO: OX COMPANY       120

SEARCH KEYWORD SUMMING REPORT FOR
PROMOTION ON "RAW CHOCOLATE
PROFESSIONALLY MADE BY CHEF"

PROMOTION PERIOD : MARCH 1, 2000 THROUGH MARCH 14, 2000
PROMOTION KEYWORD : RAW CHOCOLATE

◎SEARCH KEYWORD RANKING

| FIRST RANK: | RAW CHOCOLATE: | 567 ENTRIES |
|---|---|---|
| SECOND RANK: | PROFESSIONALLY: | 428 ENTRIES |
| THIRD RANK: | CHEF: | 267 ENTRIES |
| FOURTH RANK: | RAW CREAM : | 89 ENTRIES |
| FIFTH RANK: | LUXURIOUSLY: | 25 ENTRIES |

1376 ENTRIES IN TOTAL

FIG. 18

INFORMATION SEARCHING APPARATUS AND METHOD FOR ONLINE AWARD ENTRY

BACKGROUND OF THE INVENTION

1. Field of the Invention

The present invention relates to a technology for searching information on a computer network.

2. Description of the Related Art

In recent years, the Internet has been widely used as a medium for transmitting advertisements. For example, advertising pictures (referred to as banners) are linked to many WWW (World Wide Web) (referred to as web) sites.

In the advertising business, a quiz type awarding promotion using an advertising medium (such as a newspaper, a magazine, a poster, or a television program) is commonly performed. A quiz entrant sends the answer of the quiz and his or her personal identification (such as the name and address) using a postcard, a facsimile, an e-mail, or the like to the awarding promoter (for example, an advertiser or an advertising agent) so as to enter for the award.

Recently, an awarding promotion using the Internet has been widely performed. For example, a quiz entrant may know an awarding promotion with a banner linked to other web sites. The quiz entrant may answer the quiz or a questionnaire on the homepage of the quiz promoter linked to the banner. Thus, the quiz entrant can enter for the quiz on line.

However, in the banner advertisements on the Internet, advertisers cannot know whether or not the consumers have browsed the advertisements on their web sites. Thus, the advertisers cannot know the effects of their advertisements.

In a promotion using the above-described advertise medium (such as a newspaper, a magazine, a poster, or a television), it takes a long time (for example, several months) until the promotion is started. Thus, the advertiser should spend much money. In addition, entrants should perform many miscellaneous works to get benefits of the awarding promotion. In other words, an entrant should paste a stamp on an entry postcard, purchase a postcard, write the answer of the quiz and the personal information of the entrant to the postcard, and drop the postcard into a mailbox.

In the case of a awarding promotion using the Internet, a simple quiz is used (for example, the answer of the quiz is just a product name). In such an easy quiz, the entrant can get the benefit of the awarding promotion without need to carefully read the advertisement. Thus, the advertiser cannot know whether the advertisement message has appealed to the consumers through the awarding promotion.

SUMMARY OF THE INVENTION

From the above-described point of view, the present invention is made. An object of the present invention is to provide a technology that allows an advertising promotion to be effectively performed using an information searching apparatus (search engine) that searches information on a network.

The present invention is especially effective for a business model of which a search engine is used for searching information and charging for the use of the search engine.

Next, an example of the business model will be described in detail. An entrant selects his or her impressive keyword from an advertisement in a promotion page on a computer network. A search engine presents an unpublished page to the entrant corresponding to the selected keyword. The entrant looks for a target page using the search result. The entrant can enter for the awarding promotion on the target page. The provider of the search engine charges the promoter of the awarding promotion for the use of the search engine and for the keyword list for searching a target page.

The present invention is suitable for the above-described business model.

A first aspect of the present invention is an information searching apparatus for searching location information that represents the location of content information which is concerned with a keyword transmitted from a user's terminal apparatus, comprising a creating unit creating a database for storing location information of predetermined content information of which the location on the network is unpublished, and a searching unit searching the database for a keyword that is input to a search keyword input field of a predetermined web page browsed with the user's terminal apparatus.

A second aspect of the present invention is an information server, connected to a network, for transmitting stored information to the network, comprising a search keyword input page transmitting unit transmitting a web page to a user's terminal apparatus, the web page containing a search keyword input field in which a keyword is input, the keyword causing an information searching apparatus to search location information representing the location of content information on the network, and a location unpublished information transmitting unit transmitting content information, of which the location on the network is unpublished, to the user's terminal apparatus corresponding to a request issued by the user's terminal apparatus, when a keyword is input to the search keyword input field of the web page browsed on the user's terminal apparatus, the keyword causing the information searching apparatus to search the location information of the content information, of which the location on the network is unpublished.

A third aspect of the present invention is a user's terminal apparatus, connected to a network, comprising a web page browsing unit browsing a web page containing a search keyword input field in which a keyword is input, the keyword causing an information searching apparatus to search location information representing the location of content information, of which the location on the network is unpublished, and a search keyword transmitting unit transmitting the keyword that has been input in the search keyword input field to the information searching apparatus.

According to the above-described structures, using a searching apparatus for searching information on a network, an advertising promotion can be effectively performed.

BRIEF DESCRIPTION OF DRAWINGS

The present invention will be more apparent from the following detailed description when the accompanying drawings are referenced.

FIG. 4 is a schematic diagram showing an example of a target page that is created;

FIG. 5 is a schematic diagram showing an example of a reference page that is created;

FIG. 7 is a schematic diagram showing the data structure of an index database;

FIG. 14 is a flow chart showing a promotion proceeding process;

FIG. 18 is a schematic diagram showing an example of a search keyword summing report.

DESCRIPTION OF PREFERRED EMBODIMENT

Figure 1:
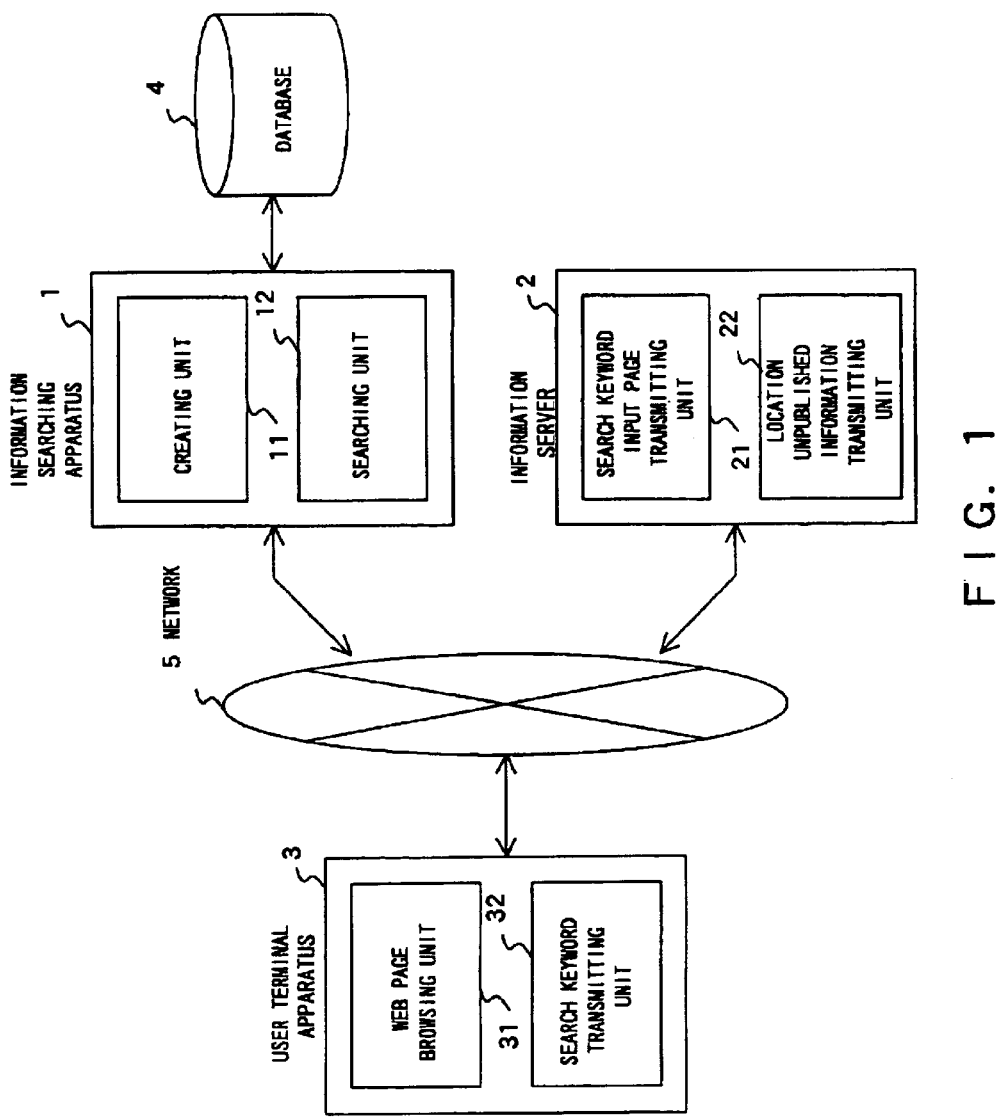
FIG. 1 is a block diagram showing the theoretical structure of an information searching apparatus, an information server, and a user terminal apparatus according to the present invention.

FIG. 1 is a block diagram showing the theoretical structure of an information searching apparatus, an information server, and a user's terminal apparatus according to the present invention.

In FIG. 1, an information searching apparatus 1 searches location information that represents the location of content information (on a network 5) containing a keyword transmitted from a user's terminal apparatus 3. The information searching apparatus 1 comprises a creating unit 11 and a searching unit 12.

The creating unit 11 creates a database 4 for storing location information of predetermined content information, of which the location on the network 5 is unpublished.

The searching unit 12 searches the database 4 for a keyword that is input to a search keyword input field of a predetermined web page browsed with the user's terminal apparatus 3.

An information server 2 is connected to a network 5. The information server 2 transmits stored information to the network 5. The information server 2 comprises a search keyword input page transmitting unit 21 and a location unpublished information transmitting portion 22.

The search keyword input page transmitting unit 21 transmits a web page to a user's terminal apparatus 3, the web page containing a search keyword input field in which a keyword is input, the keyword causing an information searching apparatus 1 to search location information representing the location of content information on the network 5.

The location unpublished information transmitting unit 22 transmits content information, of which the location on the network 5 is unpublished, to the user's terminal apparatus 3 corresponding to a request issued by the user's terminal apparatus 3, when a keyword is input to the search keyword input field of the web page browsed on the user's terminal apparatus 3, the keyword causing the information searching apparatus 1 to search the location information of the content location, of which the location on the network 5 is unpublished.

A user's terminal apparatus 3 is connected to a network 5. The user's terminal apparatus 3 comprises a web page browsing unit 31 and a search keyword transmitting unit 32.

The web page browsing portion 31 browses a web page containing a search keyword input field in which a keyword is input, the keyword causing an information searching apparatus 1 to search location information representing the location of content information, of which the location on the network 5 is unpublished.

The search keyword transmitting unit 32 transmits the keyword that has been input in the search keyword input field contained in the web page browsed by the web page browsing unit 31 to the information searching apparatus 1.

In the above-described structure, location information of content information (content information whose location is unpublished) transmitted from the location unpublished information transmitting unit 22 is stored to the database 4 by the creating unit 11.

The web page (containing the search keyword input field) that is transmitted from the search keyword input page-transmitting unit 21 to the user terminal apparatus 3 is browsed by the web page browsing unit 31. When a keyword is input to the search keyword input field of the web page, the keyword is transmitted to the information searching apparatus 1 by the search keyword transmitting unit 32.

With reference to the database 4, the searching unit 12 of the information searching apparatus 1 searches location information of content information corresponding to the keyword (that is input to the search keyword input field) transmitted from the user terminal apparatus 3. Thus, when the keyword transmitted from the user terminal apparatus 3 correlates with the information transmitted from the location unpublished information transmitting unit 22, the searching unit 12 can search the location of the content information even if the location thereof is unpublished on the network 5.

When the user terminal apparatus 3 receives the location information of the content information as the search result corresponding to the keyword that has been transmitted and requests the information server 2 for the transmission request for the content information corresponding to the location information, the location unpublished information transmitting unit 22 transmits the content information, of which the location is unpublished, to the user terminal apparatus 3. Thus, the user terminal apparatus 3 can obtain the unpublished content information.

In other words, when the user repeatedly selects keywords and searches information corresponding to the selected keywords using the user terminal apparatus 3, he or she performs a game for searching unpublished content information. To search unpublished content data, the user should repeatedly browse particular web pages on which he or she can search information. Thus, when advertisements are placed on such web pages, since the user frequently sees them, the advertisement efficiency improves.

The unpublished content information is award entry information. The database 4 stores location information of award entry information so that the user plays a game for searching the award entry information using the user terminal apparatus 3. In such a structure, since the speculative spirit of the user is stimulated, it can be expected that the number of users increases. Thus, it can be expected that the advertisement effect further improves.

The web page may contain a keyword with which the location information of the award entry information is obtained as a search result of the searching unit 12. According to such a structure, since the user has an idea of what search keyword to use, he or she can easily find target award entry information. In addition, when advertisements are placed on such web pages, since the user tends to carefully watch the advertisements, the advertisement effect further improves.

When a plurality of records of the location information are obtained as the search result corresponding to the keyword, the searching unit 12 outputs rankings corresponding to the correlation of content information represented by the location information and the keyword. The award entry information may be highly correlated with the keyword contained in the web page.

The award entry information contains an input field in which the keyword is input and is described in HTML (HyperText Markup Language). The award entry information is highly correlated with the keyword contained in the web page in such a manner that the keyword is contained in a portion defined in a META tag defined in HTML.

According to such a structure, since award entry information is highly ranked, the user watches only highly ranked information for searching target information. In other words, highly ranked information becomes a hint for searching target information.

The web page contains an award entry keyword. The award entry information is a web page containing an award keyword input field in which the entry keyword is input. The award entry may be accepted only when the award keyword has been input to the entry keyword input field.

The user's terminal apparatus 3 further comprises an entry keyword transmitting unit transmitting the keyword that has been input in the entry keyword input field to the network.

The information server 2 further comprises an accepting unit for determining whether or not an award entry keyword that has been input in the entry keyword input field is the same as a search keyword that has appeared on a web page containing a search keyword input field and accepting an award entry when they are the same when an award entry is transmitted from the user's terminal apparatus 3 through the network 5.

According to such a structure, even if location information of unpublished award entry information is leaked out, when the user enters for the awarding promotion, since the user should browse a web page containing a search keyword input field, the advertisement effect of the advertisement on the web page does not deteriorate.

The keyword input page transmitting unit 21 changes the entry keyword whenever the keyword input page transmitting unit 21 transmits a web page containing the search keyword input field. Thus, even if the entry keyword is leaked out, the advertisement effect of the advertisement on the web page can be prevented from deteriorating.

The information searching apparatus 1 may further comprise a search entry summing unit summing the number of entries for each keyword that have been input in the search keyword input field and searched by the searching unit 12.

According to such a structure, the degree of the appeal of the key point of the advertisement on the web page containing the search keyword input field to the consumers can be estimated by analyzing the result summed by the search entry summing unit.

Moreover, the present invention is an information searching method for searching location information that represents the location of content information which is concerned with a keyword transmitted from a user's terminal apparatus, comprising the operations of creating a database for storing location information of predetermined content information, of which the location on the network is unpublished, and searching the database for a keyword that is input to a search keyword input field of a predetermined web page browsed with the user's terminal apparatus. Thus, the above-described object can be accomplished.

In addition, when a program that causes a computer to perform the information searching method according to the present invention is read from a computer readable storing medium and executed, the object of the present invention can be accomplished.

Next, with reference to the accompanying drawings, an embodiment of the present invention will be described.

Figure 2:
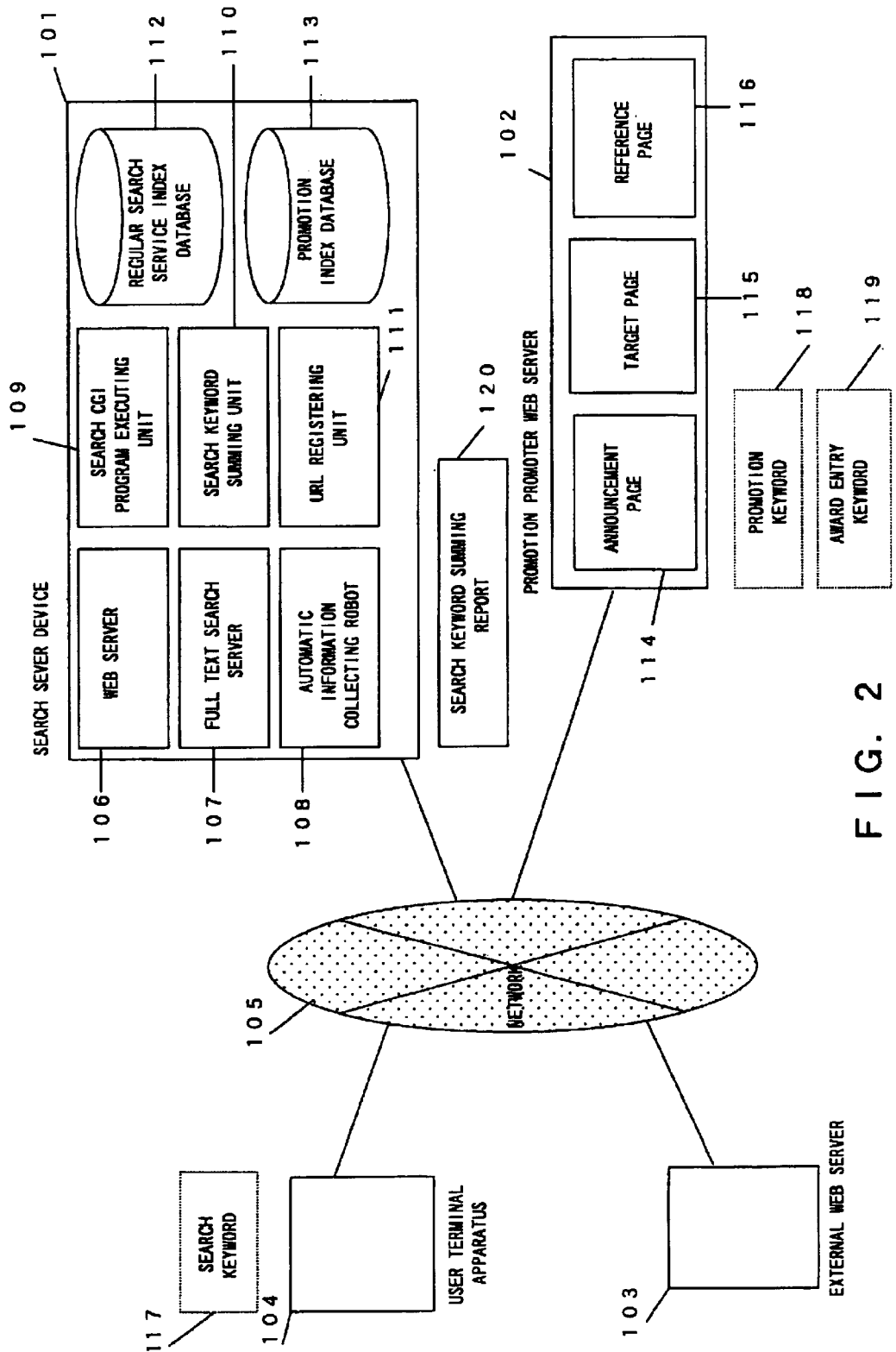
FIG. 2 is a schematic diagram showing the overall structure of a system according to the present invention.

FIG. 2 shows the structure of the entire system according to the present invention. In FIG. 2, a search server device 101, a promotion promoter web server 102, an external web server 103, and a user terminal apparatus 104 are connected to a network 105 in such a manner that data is exchanged thereamong. According to the embodiment of the present invention, as the network 105, the Internet is used.

The search server device 101 provides a search engine for searching information published in the network 105. The search server device 101 comprises a web server 106, a full text search server 107, an automatic information collecting robot 108, a search CGI program executing unit 109, a search keyword summing unit 110, a URL registering unit 111, a regular search service index database 112, and a promotion index database 113.

The web server 106 provides the user with the search engine of the search server device 101 as a web page.

The full text search server 107 is a server that provides the user with a full text search engine for searching full text of information published by the network 105 for information that the user desires corresponding to a keyword.

The automatic information collecting robot 108 automatically searches information published on the network 105 and collects words contained in the information and creates a database with an index of the collected words.

The search CGI (Common Gateway Interface) program executing unit 109 executes a program for searching information stored in a database for a URL (Uniform Resource Locator) that represents the location of a file (containing a keyword that the user inputs) in the network 105 corresponding to a search request issued from a web browser of the user and for providing the user with the URL.

The search keyword summing unit 110 sums the number of entries of a keyword designated for an information search using the search server device 101 in a game type awarding advertising promotion (that will be described later in detail) and outputs the summed result as a search keyword summing report 120.

The URL registering unit 111 registers the content of published information to the database of the search server device 101 corresponding to information provided by an information provider that publishes the information on the network 105.

The regular search service index database 112 is a database of information published on the network 105. The automatic information collecting robot 108 or the URL registering unit 111 updates data of the regular search service index database 112. In addition, the regular search service index database 112 is used by the search CGI program executing unit 109 for searching information using a keyword.

The promotion index database 113 is a database used along with the regular search service index database 112 only when a game entrant searches information in the game type awarding advertising promotion (that will be described later in detail). The automatic information collecting robot 108 or the URL registering unit 111 registers a keyword of an unpublished web page of the advertising promotion to the promotion index database 113.

The promotion promoter web server 102 is a web server managed and operated by a promoter (an advertiser or an advertising agent) who promotes a game type awarding advertising promotion (that will be described later in detail). The promotion promoter web server 102 provides various web pages such as an announcement page 114, a target page 115, and a reference page 116. The announcement page 114 contains a promotion keyword 118 and an award entry keyword 119. Details of those web pages will be described later in detail.

Information of web pages stored in the promotion promoter web server 102 is collected by the automatic information collecting robot 108 of the search server device 101 or registered by the URL registering unit 111 thereof. The collected or registered information is stored in the database of the search server device 101.

The external web server 103 is a web server managed and operated by a third party such as a provider of the network 105. The external web server 103 provides users with a part of a storage device thereof. Namely, the external web server 103 provides the users with a so-called hosting service. The promoter of the promotion may publish various web pages such as an announcement page 114, a target page 115, and a reference page 116 using such a hosting service instead of using the promotion promoter web server 102.

The user terminal apparatus 104 is a terminal unit that has a web browser and that is used by an entrant who enters for a game type awarding advertising promotion (that will be described later in detail). The entrant plays a game in such a manner that he or she inputs a search keyword 117 to the search server device 101, obtains a search result, and searches a target page corresponding to the search result. In reality, a large number of user terminal apparatuses 104 are connected to the network 105.

Next, an example of a game type awarding advertising promotion performed by the system shown in FIG. 2 will be described.

Figure 3:
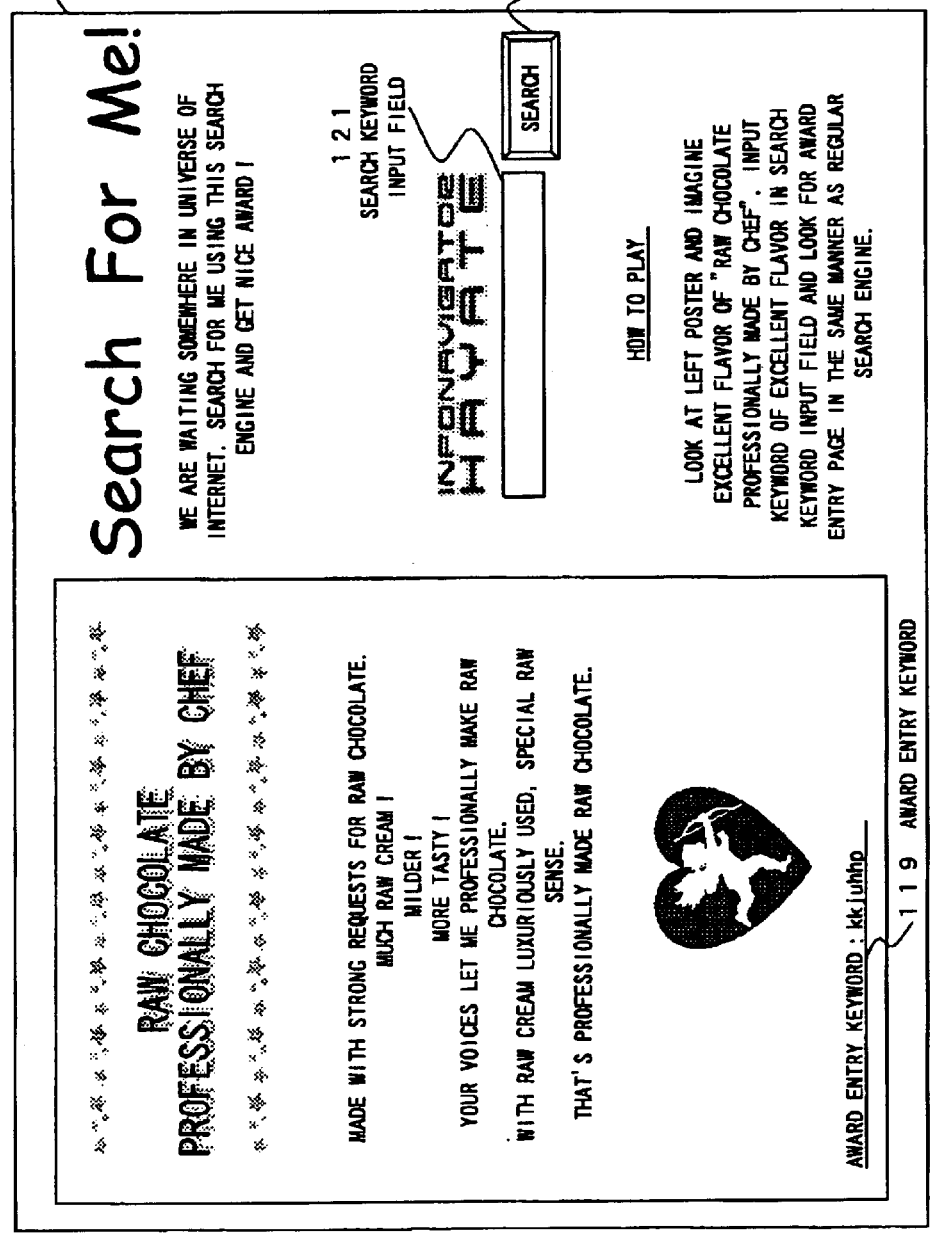
FIG. 3 is a schematic diagram showing an example of an announcement page that is created.

FIGS. 3, 4, and 5 show examples of various web pages contained in the promotion promoter web server 102 (or the external web server 103). FIG. 3 shows an example of an announcement page 114. FIG. 4 shows an example of a target page 115. FIG. 5 shows an example of a reference page 116. Those examples relate to an advertising promotion of a product "raw chocolate".

The announcement page 114 is a page with which an advertising promotion is performed. The announcement page 114 is the top web page with which a game entrant starts a game. As shown in FIG. 3, the announcement page 114 contains a search keyword input field 121. In addition, the announcement page 114 is designated an award entry keyword 119. The award entry keyword 119 is a keyword that an entrant should input when he or she enters for an award on a target page 115 (that will be described later in detail). In other words, the announcement page 114 is used to prove that an entrant has entered for the award after he or she had browsed the announcement page 114. Whenever an entrant browses the announcement page 114, a different award entry keyword 119 is designated. The URL of the announcement page 114 is published on the network 105.

An entrant for the award accesses the announcement page 114 linked from a search result of the search engine or a banner pasted on another web page on the network 105 with the user terminal apparatus 104.

At that point, the entrant reads and understands "how to play" of the game on the announcement page 114, selects a keyword from the advertisement message of the product "raw chocolate" described on the right of the announcement page 114 and obtains a search keyword 117. The entrant inputs the selected search keyword 117 to the search keyword input field 121 and clicks a search button 122 with a mouse or the like. Information corresponding to those operations is transmitted to the search server device 101.

Corresponding to the keyword search request, the search CGI program executing unit 109 of the search server device 101 executes an information searching process. At that point, the search CGI program executing unit 109 searches the regular search service index database 112 and the promotion index database 113 that contains information of keywords of a target page 115 and a reference page 116 that are web pages of the advertising promotion for the search keyword 117 selected on the announcement page 114 and transmits the search result to the user terminal apparatus 104.

The entrant browses a web page as the search result. Thereafter, the entrant repeatedly searches keywords and browses web pages. Finally, when the entrant finds a target page 115, the game is over.

Pages of advertising promotions may be highly ranked by the searching server device 101 so that an entrant can easily find a target page 115.

A target page 115 shown in FIG. 4 contains a description as a target page. In addition, the target page 115 contains an award entry form 123 and so forth. The URL of the target page 115 is not published. The URL of the target page 115 has been heeded not to be registered to search databases of search engines on the network 105 except for the promotion index database 113 of the search server device 101. The award entry form 123 contains personal information fields for an entrant (such as an address field, a name field, and so forth) and an award entry field 124. Unless the entrant inputs the award entry keyword 119 that is obtained only on the announcement page 114, he or she cannot enter for the award. The promoter of the advertising promotion determines whether or not the award entry keyword 119 that was input in the award entry field 124 is correct. Only when the award entry keyword 119 is correct, the promoter accepts the award entry.

As shown in FIG. 5, a reference page 116 contains information related to for example a promotion. When an entrant browses the reference page 116 while searching for a target page 115, the reference page 116 provides the entrant with additional information of the promotion product so as to improve the advertisement effect. The URL of the reference page 116 is also unpublished. The URL of the reference page 116 is registered to the promotion index database 113 of the search server device 101. A reference page 116 may not be created. The URL of a reference page 116 may be published.

Figure 6:
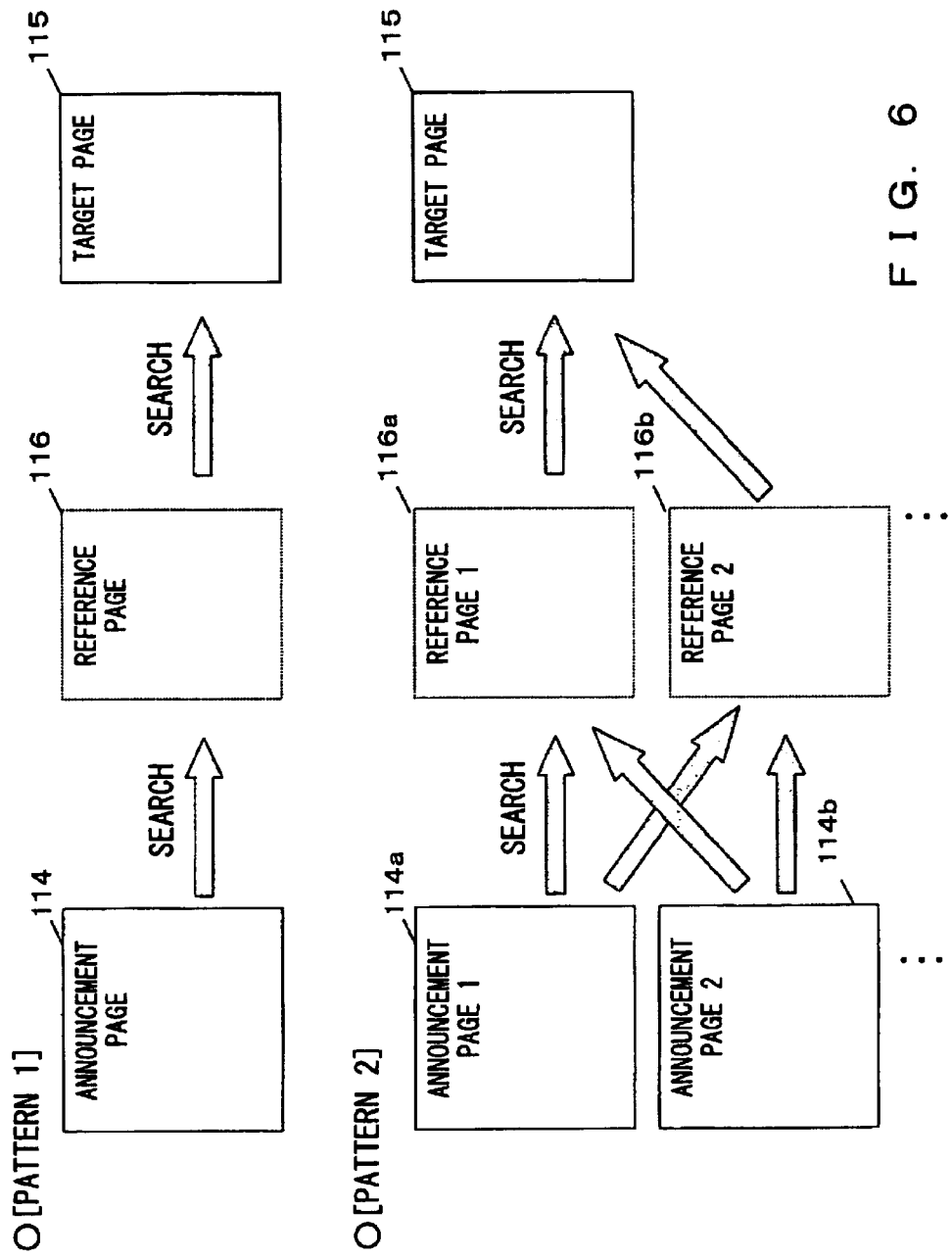
FIG. 6 is a schematic diagram showing an example of the structure of an announcement page, a target page, and a reference page.

FIG. 6 shows an example of the structure of a announcement page 114, a target page 115, and a reference page 116. In pattern [1] shown in FIG. 6, one announcement page 114 and one target page 115 are created. In the case, a search keyword is designated so that the target page 115 is found through the announcement page 114. In pattern [2] shown in FIG. 6, a plurality of announcement pages 114a, 114b, . . . , and so forth and a plurality of reference pages 116a, 116b, . . . , and so forth are created. In the case, a search keyword is designated so that before one target page 115 is found, several searching operations are performed.

Next, the data structures of the regular search service index database 112 and the promotion index database 113 will be described. As shown in FIG. 7, the data structure of the regular search service index database 112 is the same as that of the promotion index database 113.

Referring to FIG. 7, the index database contains an index database 131 and an answer table 132.

The index database 131 contains a search keyword field and an index number field.

The search keyword field contains search keywords extracted from each web page collected by the automatic information collecting robot 108 or registered by the URL registering unit 111. The index number field contains record numbers of the answer table 132 corresponding to the search keywords.

The answer table 132 contains records each of which has a uniquely assigned number, a title field, a URL field, and a summary field.

The title field contains the title of each web page collected by the automatic information collecting robot 108 or registered by the URL registering unit 111. In reality, the title field contains data defined by a <title> tag of a web page described in HTML (HyperText Markup Language).

The URL field contains the URL that represents the location of each web page on the network 105 and that is collected by the automatic information collecting robot 108 or registered by the URL registering unit 111.

The summary field contains the top unit of the main text of each web page collected by the automatic information collecting robot 108 or registered by the URL registering unit 111. In reality, the summary field contains the top unit of the text defined by a <body> tag of each web page described in HTML.

When the game type awarding advertising promotion is performed using the system shown in FIG. 2, the following processes are performed by the individual units of the system.

Figure 8:
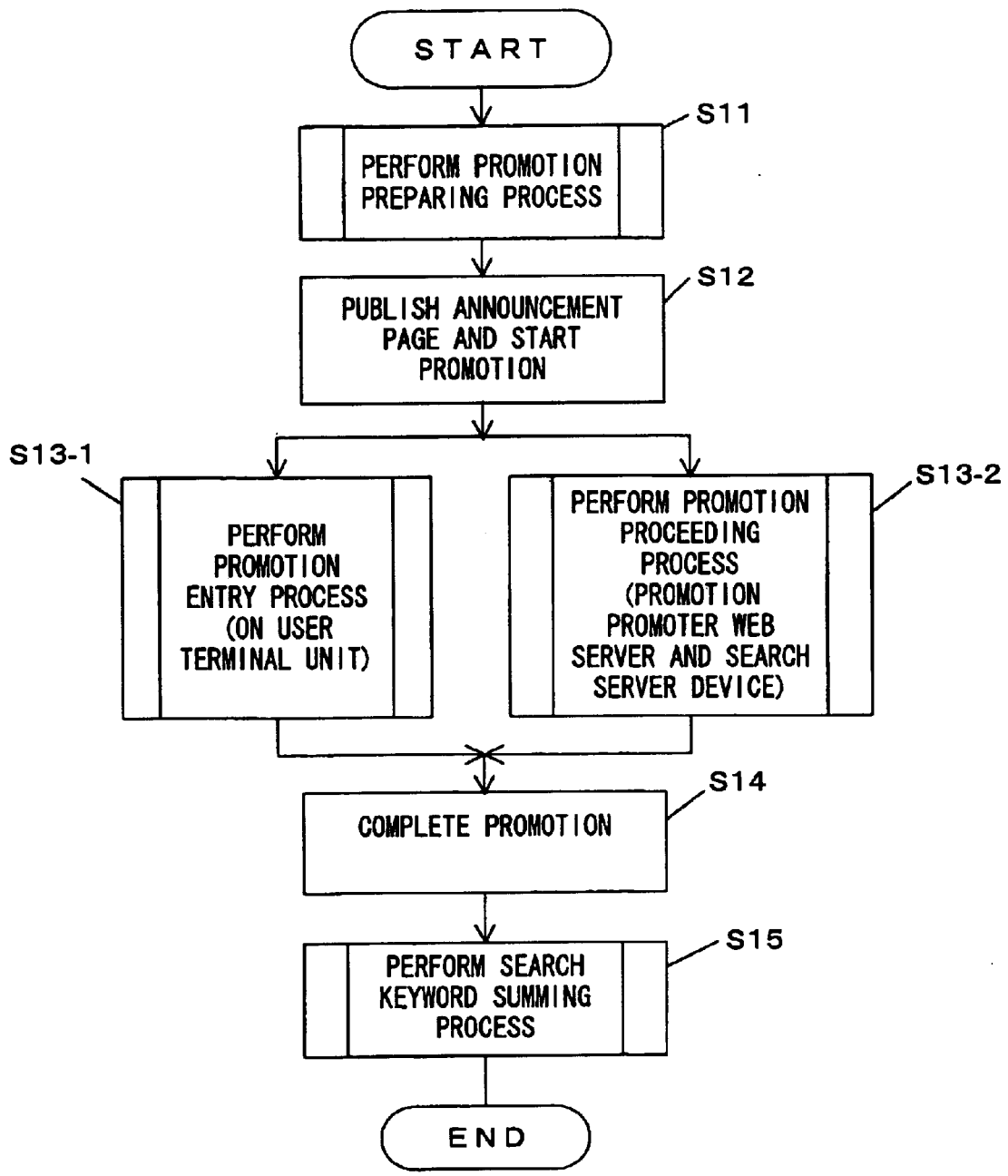
FIG. 8 is a flow chart showing a process for a game type awarding advertising promotion of the system shown in FIG. 2.

FIG. 8 is a flow chart showing a process for executing a game type awarding advertising promotion performed by the system shown in FIG. 2.

At step S11, the promotion promoter web server 102 (or the external web server 103) or the search server device 101 performs a preparing process for the promotion.

At step S12, the promotion promoter web server 102 (or the external web server 103) publishes a announcement page 114 and starts the promotion.

Steps S13-1 and S13-2 are performed in parallel. At step S13-1, the user terminal apparatus 104 performs a process for entering for the promotion. At step S13-2, the promotion promoter web server 102 (or the external web server 103) and the search server device 101 perform a process for proceeding with the above-described promotion.

After the promotion period elapses, the flow advances to step S14. At step S14, the promotion promoter web server 102 (or the external web server 103) stops publishing the announcement page 114 and completes the promotion.

At step S15, the search server device 101 performs a process for summing search keywords. In the process, among keywords that are searched by the search CGI program executing portion 109 of the search server device 101, those that are input from the search keyword input field 121 on the announcement page 114 are summed and a search keyword summed report that represent keywords that were selected as search objects in the promotion is output.

Thereafter, the process for the promotion of the system is completed.

Next, processes performed at steps S11, S13-1, S13-2, and S15 will be described in detail.

Figure 9:
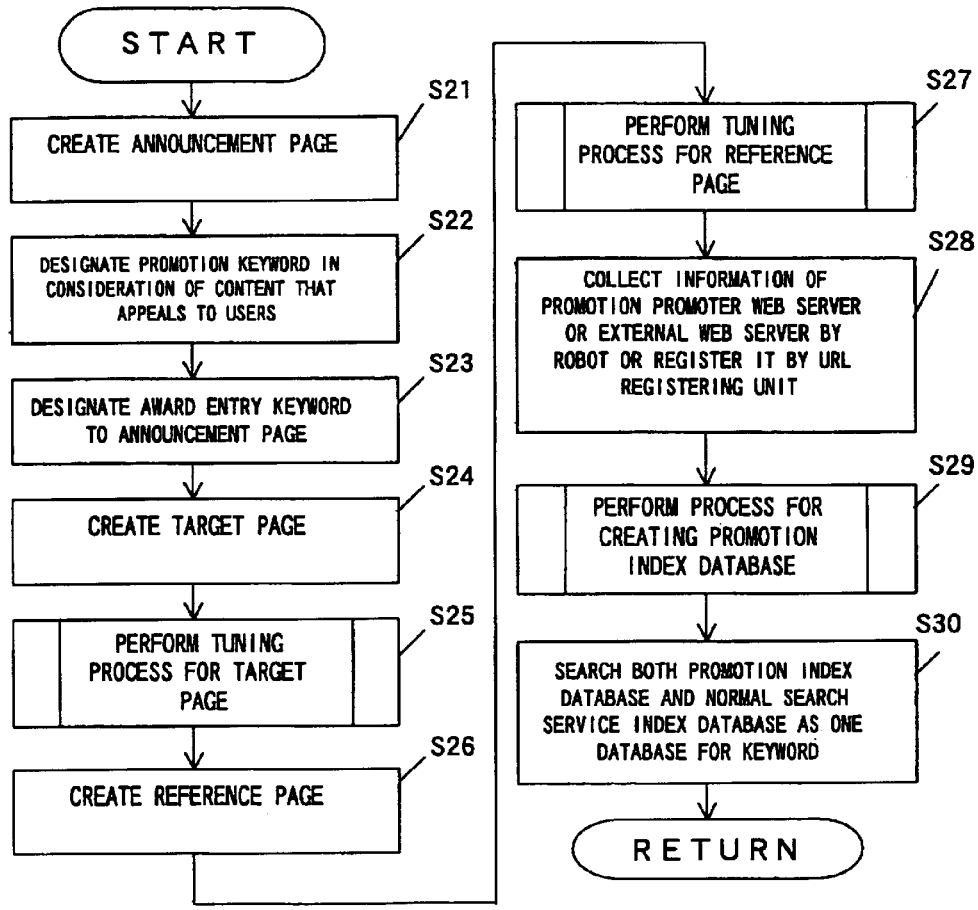
FIG. 9 is a flow chart showing a promotion preparing process.

FIG. 9 is a flow chart showing the promotion preparing process performed at step S11 shown in FIG. 8.

At step S21, the promoter of the promotion creates an announcement page 114. The announcement page 114 is stored in the promotion promoter web server 102 (or the external web server 103).

At step S22, the promoter of the promotion designates a word that he or she wants to appeal to the users as a promotion keyword 118 from the content of the announcement page 114. Information of the promotion keyword 118 is transmitted to the search server device 101.

At step S23, an award entry keyword 118 is designated to the announcement page 114 stored in the promotion promoter web server 102 (or the external web server 103). The award entry keyword 118 is only an initial value designated at the startup of the promotion. In other words, in the later processes, whenever the user terminal apparatus 104 accesses the announcement page 114, the promotion keyword 118 is updated.

At step S24, the promoter of the promotion creates a target page 115. The created target page 115 is stored in the promotion promoter web server 102 (or the external web server 103).

At step S25, a tuning process is performed for the target page 115 stored in the promotion promoter web server 102 (or the external web server 103). In the tuning process, a file describing the target page 115 is modified so that the target page 115 is highly ranked in a search result of a searching process in which a game entrant inputs the promotion keyword 118 as the search keyword 117. The tuning process will be described later in detail.

At step S26, the promoter of the promotion creates a reference page 116. The reference page 116 is stored in the promotion promoter web server 102 (or the external web server 103).

At step S27, the tuning process is performed for the reference page 116 stored in the promotion promoter web server 102 (or the external web server 103). The tuning process for the reference page 116 is the same as the tuning process for the target page 115.

At step S28, information of the promotion promoter web server 102 (or the external web server 103) is collected by the automatic information collecting robot 108 of the search server device 101 or registered by the URL registering unit 111 thereof as a search object of the search server device 101.

At step S29, a process for creating a promotion index database 113 of the search server device 101 is performed. This process will be described later in detail.

At step S30, the file describing the announcement page 114 is modified. When the search button 122 is clicked and the keyword searching operation is performed, the search CGI program executing unit 109 searches both the promotion index database 113 and the regular search service index database 112 as one database for the input keyword.

Thereafter, the promotion preparing process is completed. The flow returns to the process shown in FIG. 8.

The web pages of the announcement page 114, the target page 115, and the reference page 116 created in the promotion preparing process are described in HTML.

Figure 10:
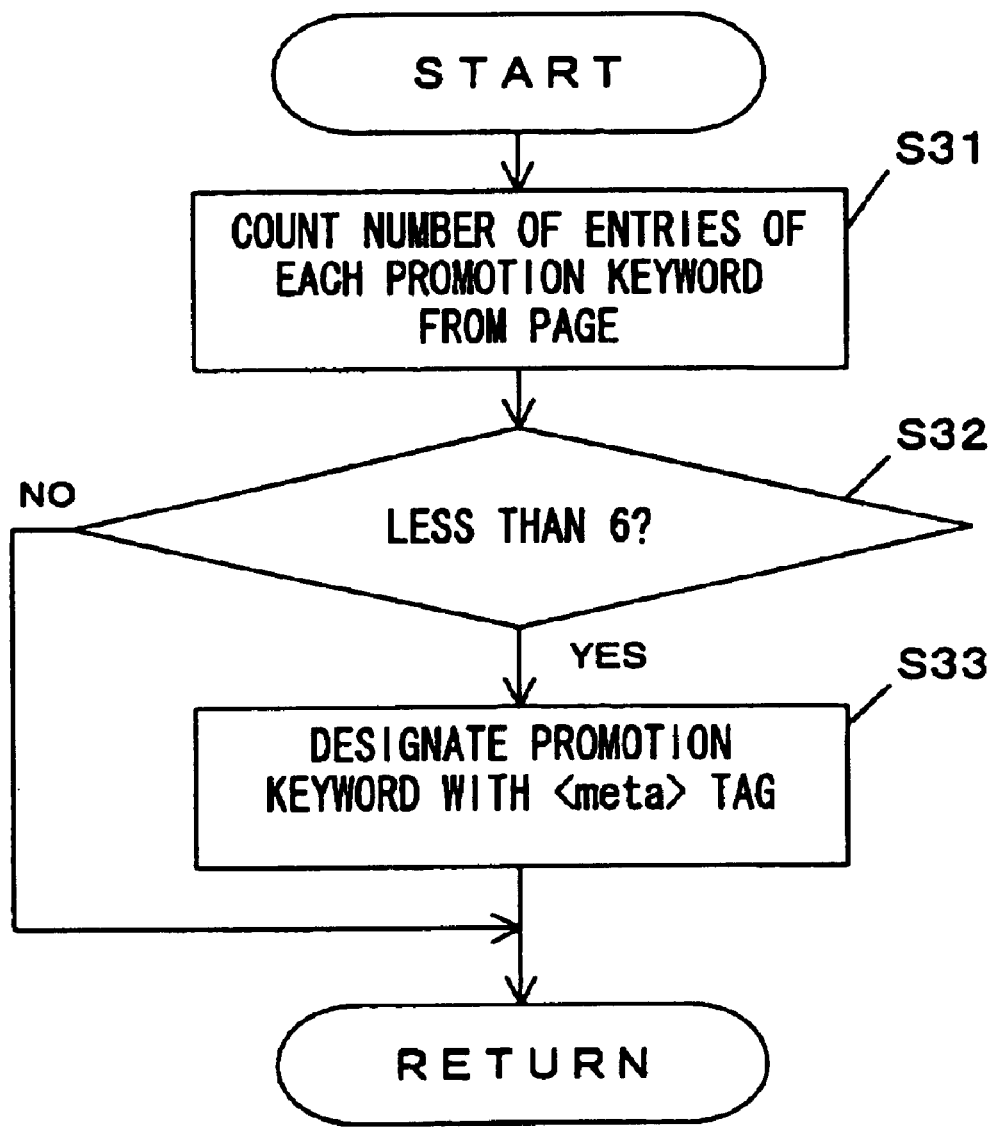
FIG. 10 is a flow chart showing a tuning process performed for a target page and a reference page.

FIG. 10 is a flow chart showing the tuning process for the target page 115 performed at step S25 shown in FIG. 9 and for the reference page 116 performed at step S27 shown in FIG. 9 by the promotion promoter web server 102.

At step S31, the number of entries of each promotion keyword 118 stored in a file describing a web page that is tuned is counted.

At step S32, it is determined whether or not the number of entries of each promotion keyword 118 is five or less. When the determined result is Yes, the flow advances to step S33. At step S33, the promotion keyword 118 is written to a portion defined by a <head> tag that represents a header portion of the objective page using a <meta> tag that represents conventional information of the objective page. When the determined result at step S32 is No, the tuning process is not performed for the promotion keyword 118.

Thereafter, the flow returns to the process shown in FIG. 9.

Figure 11:
FIGS. 11A and 11B are schematic diagrams showing a target page before a tuning process is performed and a target page after the tuning process is performed.

FIGS. 11A and 11B show an example of a target page before the tuning process is performed and an example of a target page after the tuning process is performed. In FIG. 11A, before the tuning process is performed, a file describing the target page 115 does not contain "raw chocolate" as a promotion keyword 118. In FIG. 11B, "raw chocolate, raw chocolate, raw chocolate, raw chocolate, raw chocolate, . . . " are described as the promotion keyword 118 as an underlined portion in a portion defined by a <head> tag using a <meta> tag. Thus, as shown in FIG. 11B, the file describing the target page 115 that has been tuned is obtained. Information defined by a <meta> tag does not appear when a target page 115 is normally browsed by a web browser. However, when the search CGI program executing unit 109 of the search server device 101 executes a keyword searching operation using a keyword "raw chocolate", the search CGI program executing unit 109 obtains the target page 115 that contains many entries of the keyword "raw chocolate".

When the external web server 103 contains a target page 115 and a reference page 116, if possible, the external web server 103 may perform such processes. For example, such processes may be performed by a computer that is used when a web page is created.

Figure 12:
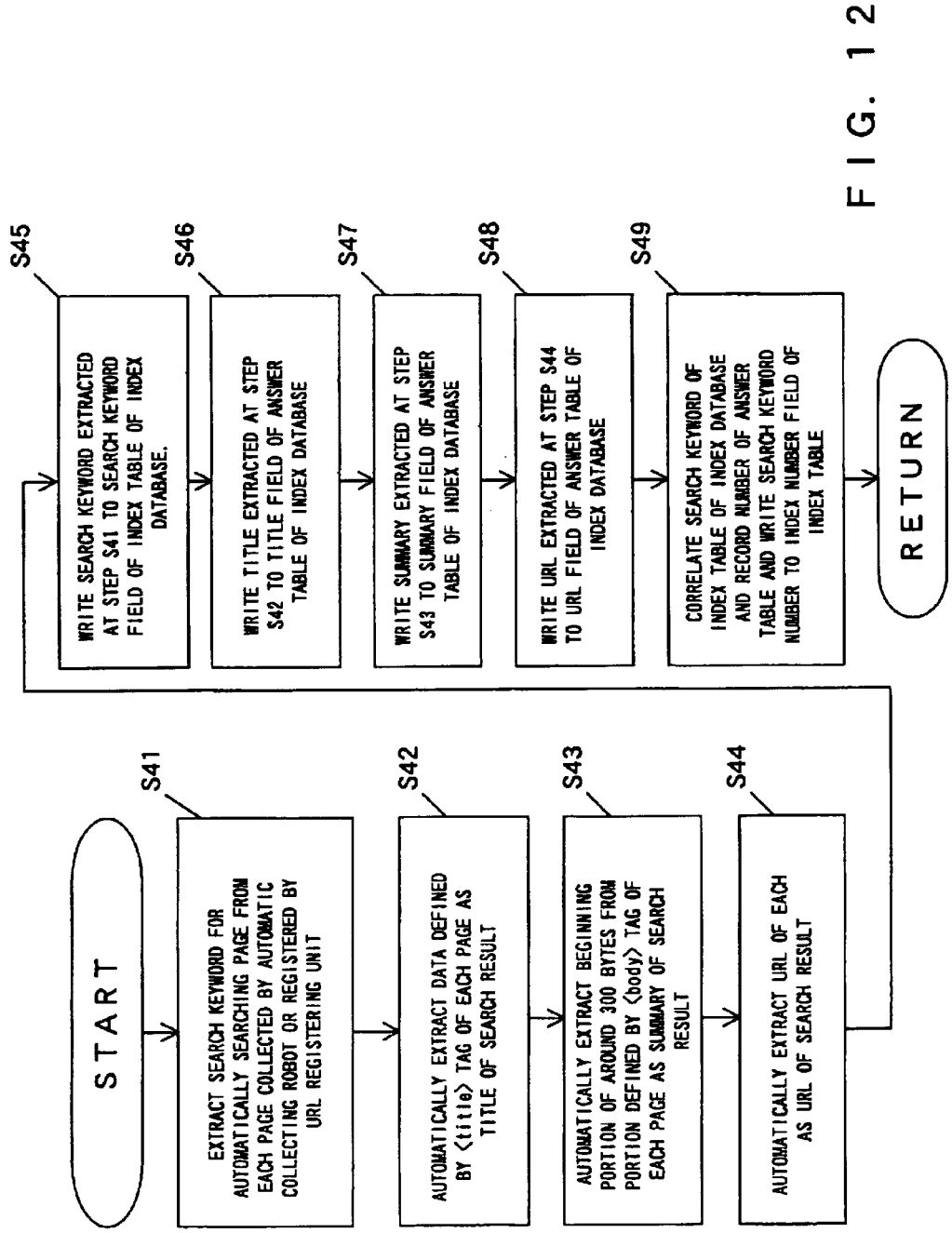
FIG. 12 is a flow chart showing a process for creating a promotion index database.

FIG. 12 is a flow chart showing a process for creating a promotion index database 113 performed at step S29 shown in FIG. 9 by the automatic information collecting robot 108 of the search server device 101 or the URL registering unit 111 thereof.

In FIG. 12, at step S41, search keywords are extracted from each web page collected by the automatic information collecting robot 108 or registered by the URL registering unit 111.

At step S42, the title of the page is extracted from the portion defined by a <title> tag. The extracted title is used for showing the result of the searching.

At step S43, the beginning portion (for example, around 300 bytes) is extracted from the portion defined by a <body> tag of the file. The extracted portion appears as the summary of the page.

At step S44, the URL is extracted from each page. The extracted URL is used as a search result to display the page.

At step S45, a search keyword extracted at step S41 is written to the search keyword field of the index table 131 of the promotion index database 113.

At step S46, the title extracted at step S42 is written to the title field of the answer table 132 of the promotion index database 113.

At step S47, the summary extracted at step S43 is written to the summary field of the answer table 132 of the promotion index database 113.

At step S48, the URL extracted at step S44 is written to the URL field of the answer table 132 of the promotion index database 113.

At step S49, a search keyword stored in the index database 131 of the promotion index database 113 is associated with a record number of the answer table 132. The search keyword number is written to the index number field of the index database 131.

Thereafter, the process for creating the promotion index database 113 is completed. The flow returns to the process shown in FIG. 9.

The process for creating the promotion index database 113 shown in FIG. 12 can be used as the process for creating the regular search service index database 112.

Figure 13:
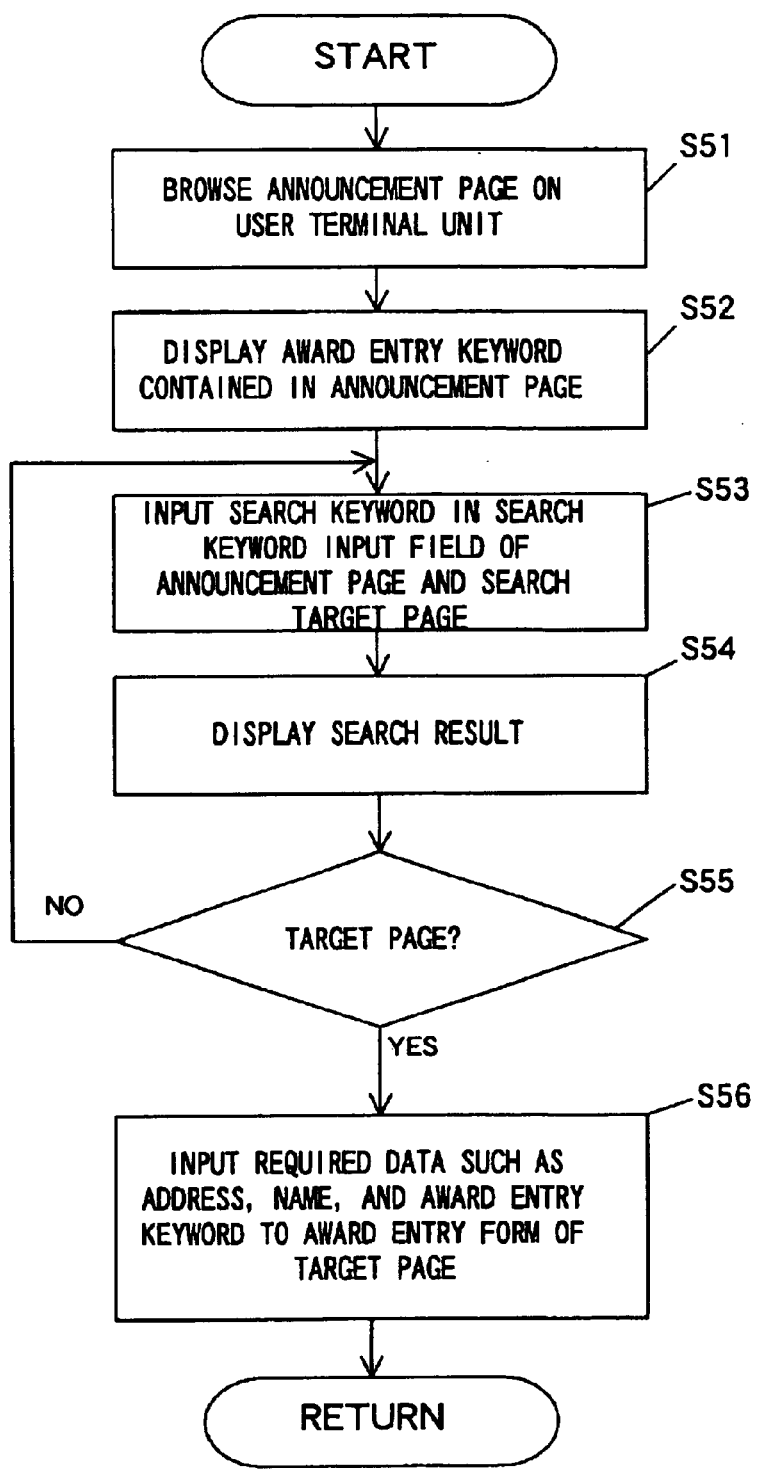
FIG. 13 is a flow chart showing a promotion entry process.

FIG. 13 is a flow chart showing a promotion entry process performed at step S13-1 shown in FIG. 8 by the user terminal apparatus 104.

In FIG. 13, at step S51, an announcement page 114 is read from the promotion promoter web server 102 (or the external web server 103). The announcement page 114 is browsed by a user (namely, the above-described game entrant of the promotion) with the user terminal apparatus 104.

At step S52, an award entry keyword 119 contained in the announcement page 114 is displayed for the entrant.

At step S53, the entrant inputs a search keyword 117 to the search keyword input field 121 of the announcement page 114 with the user terminal apparatus 104. The entrant clicks the search button 122. As a result, a keyword search command is transmitted to the search CGI program executing unit 109 of the search server device 101.

At step S54, the user terminal apparatus 104 receives the result of the searching process performed by the search CGI program executing unit 109 of the search server device 101 and displays the search result.

At step S55, with the operation of the entrant corresponding to the search result displayed on the user terminal apparatus 104, a web page as the search result is displayed on the user terminal apparatus 104. The entrant browses the search result and knows whether or not the browsed page is a target page. When the determined result at step S55 is Yes (namely, the browsed page is a target page), the flow advances to step S56. When the determined result at step S55 is No (namely the browsed page is not a target page), the flow returns to step S53. At step S53, the above-described process is repeated.

At step S56, the entrant fills in the award entry form 123 of the target page 115 for required data such as the address and name of the entrant with the operation of the user terminal apparatus 104. At step S52, the obtained award entry keyword 119 is input to the award entry field 124. As a result, the award entry process is performed.

Thereafter, the promotion entry process is completed. The flow returns to the process shown in FIG. 8.

FIG. 14 is a flow chart showing a promotion proceeding process performed at step S13-2 shown in FIG. 8 by the promotion promoter web server 102 (or the external web server 103) or the search server device 101.

At step S61, the promotion promoter web server 102 (or the external web server 103) transmits a file describing an announcement page 114 to the user terminal apparatus 104 through the network 105 corresponding to a transmission request issued by the user terminal apparatus 104.

At step S62, the promotion promoter web server 102 (or the external web server 103) performs a process for issuing an award entry keyword 119. In the process, whenever the user terminal apparatus 104 accesses an announcement page 114, a different award application keyword 119 is issued. The process will be described later in detail.

At step S63, the search CGI program executing unit 109 of the search server device 101 searches a search keyword 117 written in the search keyword input field 121 of the announcement page 114 by an entrant with the user terminal apparatus 104. In reality, the search CGI program executing apparatus 109 searches both the promotion index database 113 and the regular search service index database 112 as one database for the search keyword 117.

The search CGI program executing unit 109 records a search keyword 117 that was used in the keyword searching operation and creates a search log. The search log is used to execute a search keyword summing process (that will be described later in detail).

At step S64, the search result of the searching operation performed by the search CGI program executing unit 109 is transmitted to the user terminal apparatus 104 through the network 105.

At step S65, the entrant issues a browse request command of a web page as a target page 115 corresponding to the search result displayed on the user terminal apparatus 104. When the promotion promoter web server 102 (or the external web server 103) receives the browse request command of the target page 115 from the user terminal apparatus 104, a file describing the target page 115 is transmitted to the user terminal apparatus 104 through the network 105.

At step S66, the promotion promoter web server 102 (or the external web server 103) performs a checking process for the award entry keyword 119. In the process, it is determined whether or not the keyword written to the award entry field 124 of the target page 115 is the same as the award entry keyword 119 issued when the announcement page 114 is accessed. The process will be described later in detail.

Thereafter, the promotion proceeding process is completed. The flow returns to the process shown in FIG. 8.

Figure 15:
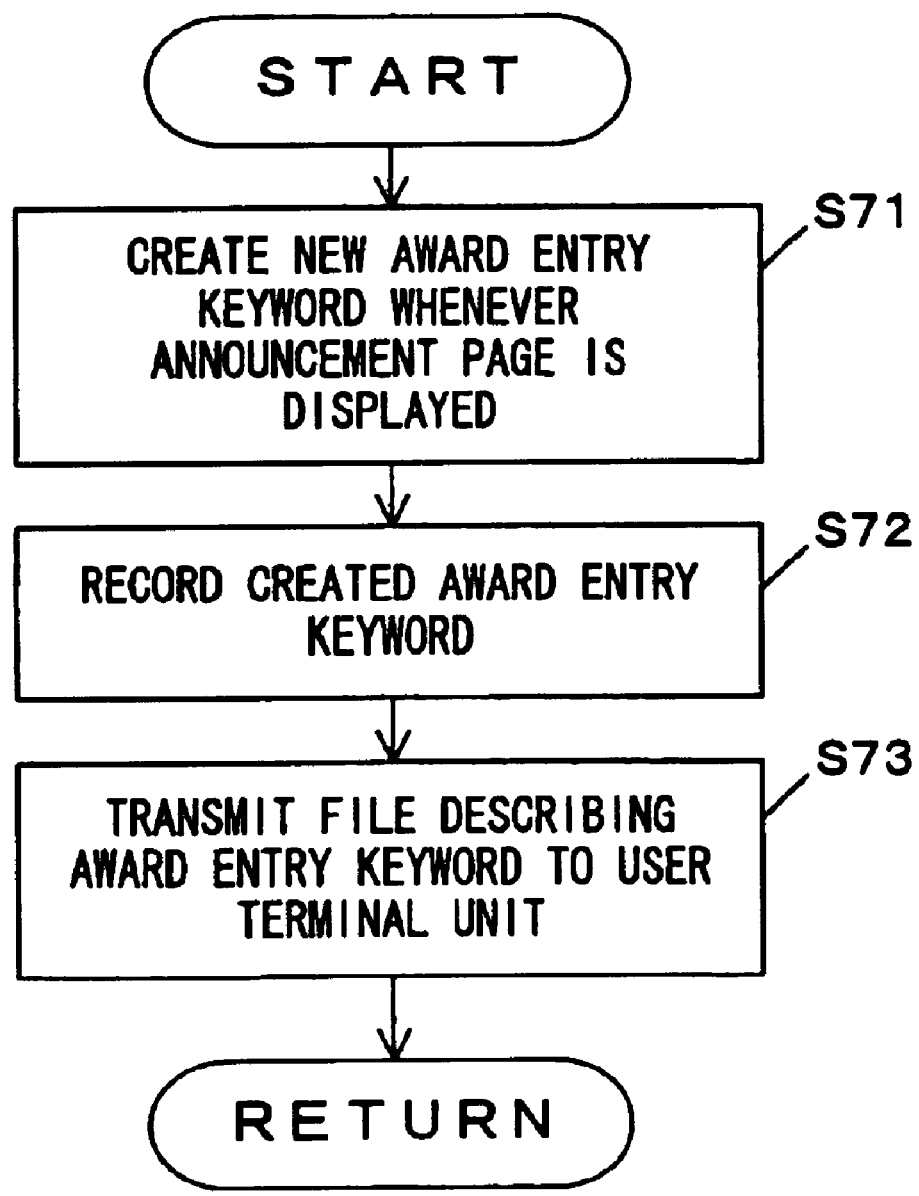
FIG. 15 is a flow chart showing an award entry keyword issuing process.

FIG. 15 is a flow chart showing an award entry keyword issuing process performed at step S62 shown in FIG. 14 by the promotion promoter web server 102 (or the external web server 103).

At step S71, a new award entry keyword 119 is created corresponding a browse request on the announcement page 114.

At step S72, the newly created award entry keyword 119 is stored to a storing portion of the promotion promoter web server 102 (or the external web server 103). The award entry keyword 119 is used in an award entry keyword checking process (that will be described later in detail).

At step S73, the created award entry keyword 119 is transmitted to the user terminal apparatus 104 through the network 105. The award entry keyword 119 appears in the display field of the promotion keyword 118 of the announcement page 114 on the user terminal apparatus 104.

Thereafter, the award entry keyword issuing process is completed. The flow returns to the process shown in FIG. 14.

Figure 16:
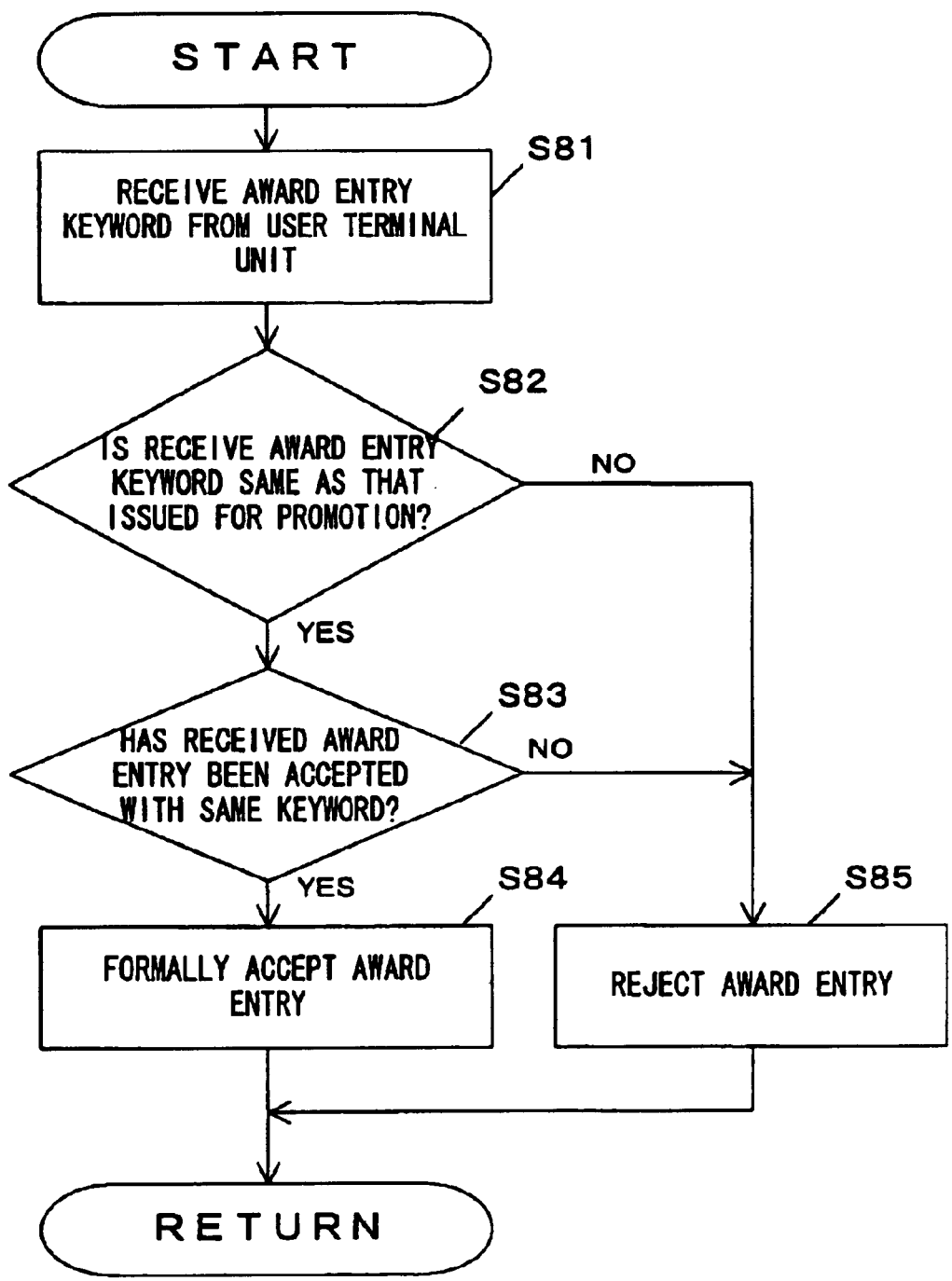
FIG. 16 is a flow chart showing an award entry keyword checking process.

FIG. 16 is a flow chart showing the award entry keyword checking process performed at step S66 shown in FIG. 14 by the promotion promoter web server 102 (or the external web server 103).

At step S81, information of the award entry that has been input to the award entry form 123 of the target page 115 is received from the user terminal apparatus 104 through the network 105.

At step S82, it is determined whether or not the keyword that has been input in the award entry field 124 of the award entry form 123 is the same as the award entry keyword 119 that has been issued for the current promotion in the above-described award entry keyword issuing process. When the determined result at step S82 is Yes, the flow advances to step S83. When the determined result at step S82 is No, the flow advances to step S85.

At step S83, it is determined whether or not an award entry that has been input in the award entry field 124 of the award entry form 123 has the same keyword as entries that have been formally accepted. When the determined result at step S83 is Yes (there are no entries with the same keyword), the flow advances to step S84. When the determined result at step S83 is No (namely, there are entries with the same keyword), the flow advances to step S85.

At step S84, the award entry received at step S81 is formally accepted. The information of the award entry is stored to the storing portion of the promotion promoter web server 102 (or the external web server 103). Thereafter, the award entry keyword checking process is completed. The flow returns to the process shown in FIG. 14.

On the other hand, at step S85, the award entry received at step S81 is determined as an invalid entry of which the game has not been completed. Thereafter, the award entry keyword checking process is completed. The flow returns to the process shown in FIG. 14.

Figure 17:
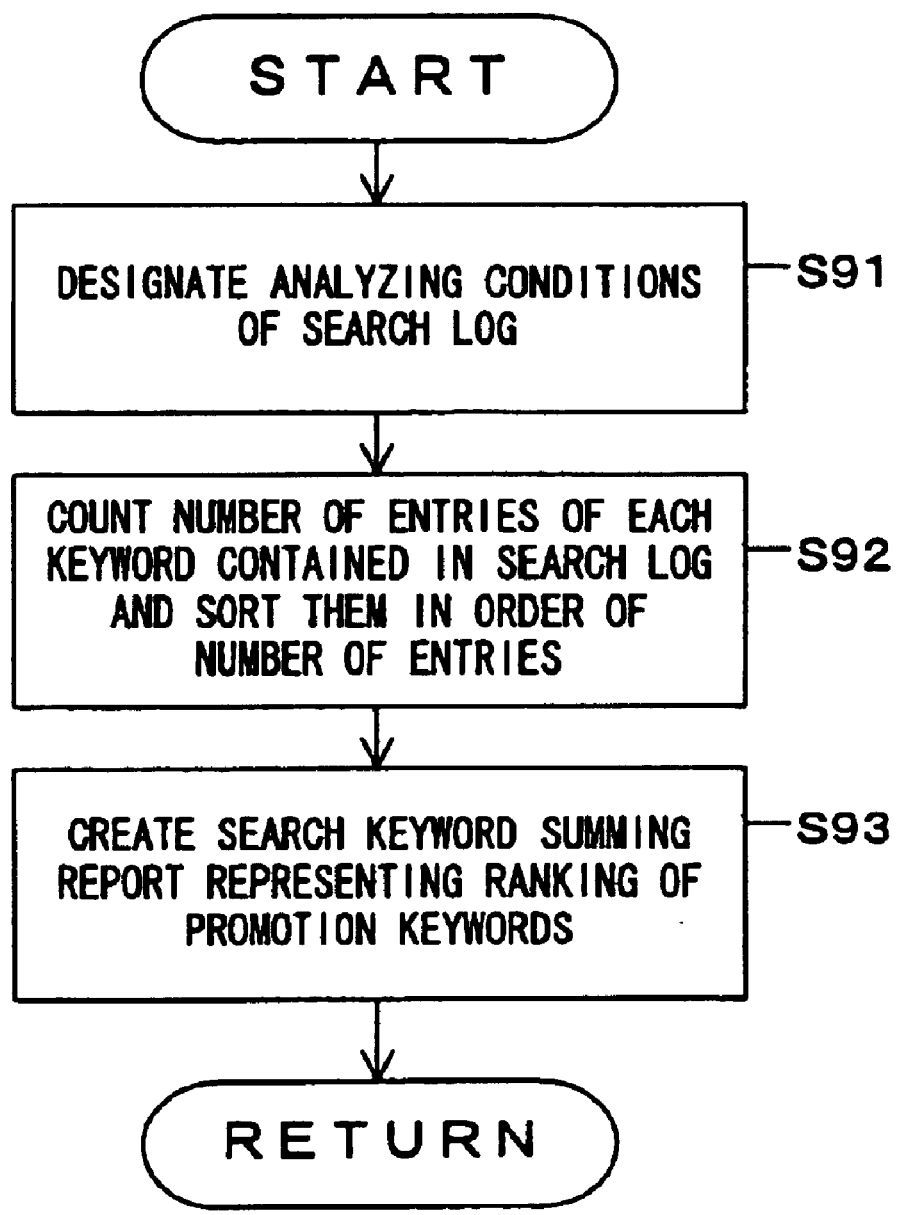
FIG. 17 is a flow chart showing a search keyword summing process.

FIG. 17 is a flow chart showing the search keyword summing process performed at step S15 shown in FIG. 8.

At step S91, analyzing conditions for analyzing the search log in which search keywords 117 have been written in the promotion proceeding process are designated. In the analyzing condition designating process, words that are supposed to appeal to the users are designated as analyzing objects.

At step S92, the search log analyzing process is performed corresponding to the analyzing conditions designated at step S91. Search keywords 117 recorded in the search log are sorted in the order of the number of entries.

At step S93, as the result of the analyzing process performed at step S92, the search keyword summing report 120 that represents the number of entries of each promotion keyword 118 designated in the above-described promotion preparing process and the ranking order thereof is created. Thereafter, the keyword summing process is completed. The flow returns to the process shown in FIG. 8.

FIG. 18 shows an example of a search keyword summing report 120. The search keyword summing report 120 contains the summed result of the entries of each search keyword 117. The ranked position of the promotion keyword 118 is highlighted (shaded). Thus, the promoter of the promotion can estimate the appeal of the promotion keyword 118 "raw chocolate" of the advertisement statement described in the announcement page 114 corresponding to the number of searched entries and the ranked position. In addition, the promoter can estimate with what words other than the promotion keyword 118 the consumers have been impressed.

A function equivalent to the search server device 101 according to the embodiment of the present invention can be performed by a general-purpose computer. To do that, a program that causes the computer to perform the processes represented by the flow charts shown in FIGS. 8 to 10 and FIGS. 12 to 17 performed by the search server device 101 is pre-stored to a computer readable storing medium. The program is read by the computer from the storing medium and temporarily loaded to a main memory of the computer. The program stored in the main memory is read and executed by a central processing unit of the computer.

Figure 19:
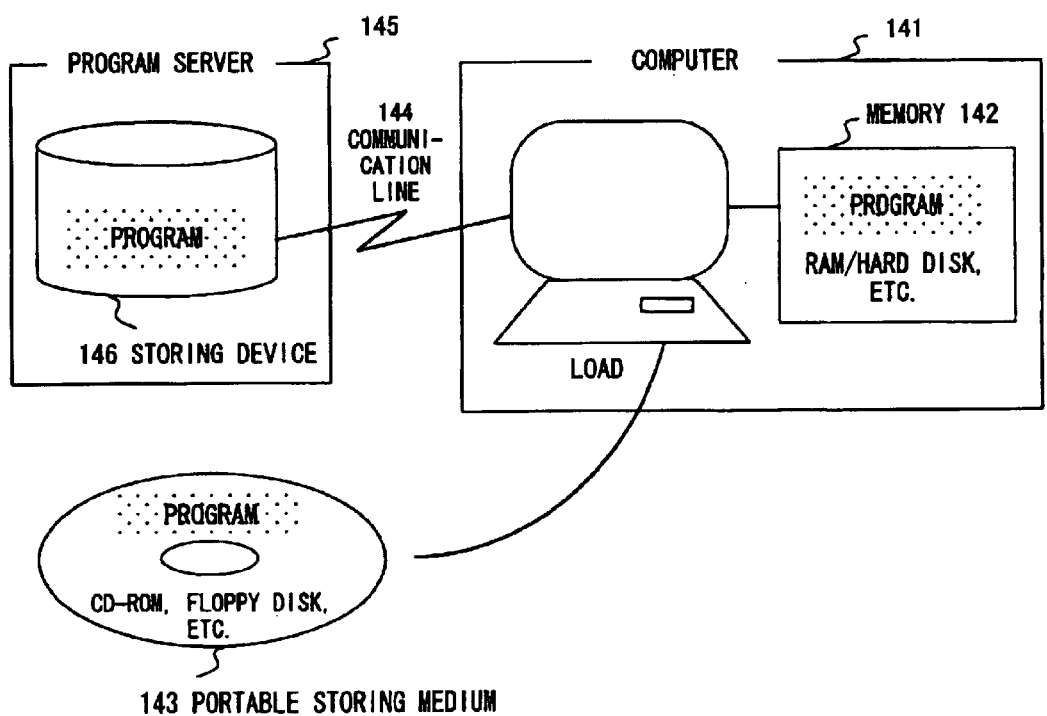
FIG. 19 is a schematic diagram showing a computer readable storage medium.

FIG. 19 shows an example of the computer readable storing medium. The computer readable storing medium may be a memory 142 (such as a semiconductor memory or a hard disk) or a portable storing medium 143 (such as a CD-ROM, a DVD-ROM, an MO (Magneto-Optical disc), or a floppy disk).

Alternatively, the computer readable storing medium may be a storing device 146 disposed in a program server 145 as a computer connected to the computer 141 through a communication line 144. In that case, a transmission signal of which a carrier wave is modulated with a data signal that represents a control program is transmitted from the program server 145 through the communication line 144 that is a transmission medium. The computer 141 demodulates the received transmission signal, reproduces the control program, and executes the control program.

In the above-described structure of the present invention, an advertising promotion technology that allows an information searching apparatus that searches information on a network to provide high advertisement effects can be provided.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. An information searching apparatus comprising:
a database which stores location information about content information including a first web page having an award entry keyword input field, the web page existing on a network and being unpublished on the network;
a searching unit which searches for the location information by referring to the database only when searching for a location of the web page based on a keyword that is transmitted from a user's terminal apparatus browsing a second web page, the second web page including:
a search keyword input field into which the keyword is input, and
an award entry keyword; and
a determining unit which determines whether the award entry keyword has been input to the award entry keyword input field,
wherein the award entry keyword is changed whenever the search keyword input field is transmitted to a user.

2. An information searching apparatus comprising:
storing means for storing location information about content information including a first web page having an award entry keyword input field, the web page existing on a network and being unpublished on the network;
searching means for searching for the location information by referring to the storing means only when searching for a location of the web page based on a keyword that is transmitted from a user's terminal apparatus browsing a second web page, the second web page including:
a search keyword input field into which the keyword is input, and
an award entry keyword; and
determining means for determining whether the award entry keyword has been input to the award entry keyword input field,
wherein the award entry keyword is changed whenever the search keyword input field is transmitted to a user.

3. An information searching method comprising:
storing location information about content information including a first web page having an award entry keyword input field, the web page existing on a network and being unpublished on the network;
searching for the location information by referring to the stored location information only when searching for a location of the web page based on a keyword that is transmitted from a user's terminal apparatus browsing a second web page, the second web page including:
a search keyword input field into which the keyword is input, and
an award entry keyword; and
determining whether the award entry keyword has been input to the award entry keyword input field,
wherein the award entry keyword is changed whenever the search keyword input field is transmitted to a user.

4. A computer program product comprising a program stored on a storage medium readable by a computer, the program when run on the computer causing the computer to perform at least:
storing location information about content information including a first web page having an award entry keyword input field, the web page existing on a network and being unpublished on the network;
searching for the location information by referring to the stored location information only when searching for a location of the web page based on a keyword that is transmitted from a user's terminal apparatus browsing a second web page, the second web page including:
a search keyword input field into which the keyword is input, and
an award entry keyword; and
determining whether the award entry keyword has been input to the award entry keyword input field,
wherein the award entry keyword is changed whenever the search keyword input field is transmitted to a user.

5. An information searching apparatus for searching location information that represents a location of content information which is concerned with a keyword transmitted from a user's terminal apparatus, comprising:
storing means for storing location information which is about prescribed content information that exists on a network and is unpublished on the network; and
searching means for searching for the location information by referring to the storing means only when searching for the location based on a keyword that is transmitted from the user's terminal apparatus browsing a specific web page containing a search keyword input field in which a search keyword is input, wherein the content information whose location information is unpublished is award entry information, wherein the web page contains a specific keyword with which location information of the award entry information is obtained as a search result of said searching means, wherein, when a plurality of records of the location information are obtained as the search result corresponding to the search keyword, said searching means outputting rankings corresponding to a correlation of content information represented by the location information and the search keyword, wherein the award entry information contains an input field in which a keyword is input and is described in HTML (Hypertext Markup Language), and wherein the award entry information is highly correlated with the specific keyword contained in the web page in such a manner that the specific keyword is contained in a portion defined in a META tag described in HTML.

6. An information searching apparatus for searching location information that represents a location of content information which is concerned with a keyword transmitted from a user's terminal apparatus, comprising:

a database for storing location information which is about prescribed content information that exists on a network and is unpublished on the network; and a searching unit searching for the location information by referring to the database only when searching for the location based on a keyword that is transmitted from the user's terminal apparatus browsing a specific web page containing a search keyword input field in which the search keyword is input, wherein the content information whose location information is unpublished is award entry information, wherein the web page contains a specific keyword with which location information of the award entry information is obtained as a search result of said searching unit, wherein, when a plurality of records of the location information are obtained as the search result corresponding to the search keyword, said searching unit outputting rankings corresponding to a correlation of content information represented by the location information and the search keyword, wherein the award entry information contains an input field in which a keyword is input and is described in HTML (Hypertext Markup Language), and wherein the award entry information is highly correlated with the specific keyword contained in the web page in such a manner that the specific keyword is contained in a portion defined in a META tag described in HTML.

7. The information searching apparatus as set forth in claim 6, wherein the web page contains an award entry keyword, and wherein the apparatus further comprises a determining unit determining whether or not an award entry has been performed by inputting the award entry keyword in the input field contained in the award entry information.

8. The information searching apparatus as set forth in claim 6, further comprising:

a search entry summing unit summing a number of entries for each keyword that has been input in the search keyword input field and searched by said searching unit.

9. An information server, connected to a network, for transmitting stored information to the network, comprising:

a search keyword input page transmitting unit transmitting a web page to a user's terminal apparatus, the web page containing a search keyword input field in which a keyword is input, the keyword causing an information searching apparatus to search for location information representing a location of content information on the network where information exists containing a keyword transmitted from the user's terminal apparatus, based on the keyword; and an unpublished location information transmitting unit transmitting unpublished location information, the location on the network of which is unpublished, the unpublished location information representing information which the information searching apparatus can search for only by inputting a keyword in the search keyword input field of the web page browsed on the user's terminal apparatus, to the user's terminal apparatus in response to a request issued by the user's terminal apparatus, wherein content information whose location is unpublished is award entry information, wherein content information transmitted from said unpublished location information transmitting unit contains a web page containing an entry keyword input field in which an entry keyword is input, and the entry keyword appears on the web page, wherein the information server further comprises an accepting unit determining whether or not an entry keyword that has been input in the entry keyword input field is the same as a search keyword that has appeared on the web page containing the search keyword input field, and accepting an award entry when the entry keyword and the search keyword are the same when the award entry is transmitted from the user's terminal apparatus through the network, and wherein said search keyword input page transmitting unit changes the entry keyword whenever said search keyword input page transmitting unit transmits a web page containing the search keyword input field.

10. An information server, connected to a network, for transmitting stored information to the network, comprising:

search keyword input page transmitting means for transmitting a web page to a user's terminal apparatus, the web page containing a search keyword input field in which a keyword is input, the keyword causing an information searching means to search location information representing the location of content information on the network where information exists containing a keyword transmitted from the user's terminal apparatus, based on the keyword; and unpublished location information transmitting means for transmitting unpublished location information, the location on the network of which is unpublished, the unpublished location information representing information which the information searching apparatus can search for only by inputting a keyword in the search keyword input field of the web page browsed on the user's terminal apparatus, to the user's terminal apparatus in response to a request issued by the user's terminal apparatus, wherein content information whose location is unpublished is award entry information, wherein content information transmitted from said unpublished location information transmitting means contains a web page containing an entry keyword input field in which an entry keyword is input, and the entry keyword appears on the web page, wherein the information server further comprises an accepting means for determining whether or not an entry keyword that has been input in the entry keyword input field is the same as a search keyword that has appeared on the web page containing the search keyword input field, and accepting an award entry when they are the same when the award entry is transmitted from the user's terminal apparatus through the network, and wherein said search keyword input page transmitting means changes the entry keyword whenever said search keyword input page transmitting unit transmits a web page containing the search keyword input field.

* * * * *

UNITED STATES PATENT AND TRADEMARK OFFICE
CERTIFICATE OF CORRECTION

PATENT NO. : 6,925,456 B2
DATED : August 2, 2005
INVENTOR(S) : Yumiko Nakano et al.

It is certified that error appears in the above-identified patent and that said Letters Patent is hereby corrected as shown below:

<u>Title page,</u>
Item [56], References Cited, U.S. PATENT DOCUMENTS,
change "O'Arlach et al." to -- D'Arlach et al. --.

Signed and Sealed this

Twenty-fifth Day of April, 2006

JON W. DUDAS
*Director of the United States Patent and Trademark Office*